US012600120B2

(12) United States Patent (10) Patent No.: US 12,600,120 B2
Higashi et al. (45) Date of Patent: Apr. 14, 2026

(54) COATING APPARATUS

(71) Applicants: Taikisha Ltd., Tokyo (JP); FU-SE VACUUM FORMING LTD., Habikino (JP)

(72) Inventors: Yoshio Higashi, Suita (JP); Yukiya Takizawa, Kawasaki (JP); Seidai Watanabe, Yamato (JP); Yoichi Kumon, Habikino (JP); Hitoshi Okamoto, Habikino (JP)

(73) Assignees: TAIKISHA LTD.; FU-SE VACUUM FORMING LTD.

( * ) Notice: Subject to any disclaimer, the term of this patent is extended or adjusted under 35 U.S.C. 154(b) by 61 days.

(21) Appl. No.: 18/741,285

(22) Filed: Jun. 12, 2024

(65) Prior Publication Data

US 2024/0416641 A1 Dec. 19, 2024

(30) Foreign Application Priority Data

Jun. 19, 2023 (JP) ................................. 2023-100248

(51) Int. Cl.
*B32B 38/18* (2006.01)
*B32B 38/00* (2006.01)

(52) U.S. Cl.
CPC ...... *B32B 38/1833* (2013.01); *B32B 38/0036* (2013.01); *B32B 2309/12* (2013.01)

(58) Field of Classification Search
CPC ............ B32B 38/1833; B32B 38/0036; B32B 309/12
See application file for complete search history.

(56) References Cited

U.S. PATENT DOCUMENTS

| | | | |
|---|---|---|---|
| 2011/0240225 A1 | 10/2011 | Yamada et al. | |
| 2014/0141264 A1* | 5/2014 | Ranade ................... | C23C 14/35 |
| | | | 428/688 |
| 2018/0141264 A1 | 5/2018 | Miura | |
| 2022/0040904 A1 | 2/2022 | Dandl et al. | |

FOREIGN PATENT DOCUMENTS

| | | | |
|---|---|---|---|
| DE | 10201389 A1 | 7/2003 | |
| DE | 10258891 A1 | 7/2004 | |
| JP | H01-210328 A | 8/1989 | |
| JP | H05-278065 A | 10/1993 | |
| JP | H11-235730 A | 8/1999 | |
| JP | 2016-140996 A | 8/2016 | |

(Continued)

OTHER PUBLICATIONS

Machine Translation of KR 20220144781 A.*

(Continued)

*Primary Examiner* — Vishal I Patel
(74) *Attorney, Agent, or Firm* — Modal PLLC

(57) ABSTRACT

A coating apparatus including: a plurality of first gripping units configured to grip a first side of a film conveyed above a work to be coated, the plurality of first gripping units being aligned along the first side; a plurality of second gripping units configured to grip a second side of the film opposing the first side, the second gripping units being aligned along the second side; and an elevating unit configured to raise and lower the plurality of first gripping units and the plurality of second gripping units along a shape of the work to be coated.

17 Claims, 16 Drawing Sheets

(56)     References Cited

FOREIGN PATENT DOCUMENTS

| JP | 2021-062625 A | 4/2021 | |
| KR | 20220144781 A | * 10/2022 | ............. B29C 63/02 |
| WO | 2010/073955 A1 | 7/2010 | |

OTHER PUBLICATIONS

Extended European Search Report in counterpart EP Patent App. No. 24182669.2, Dec. 10, 2024, 11 pages, EPO.
Partial European search report in corresponding European Patent Application No. 24182669.2, Oct. 16, 2024, 11 pages, EPO.

* cited by examiner

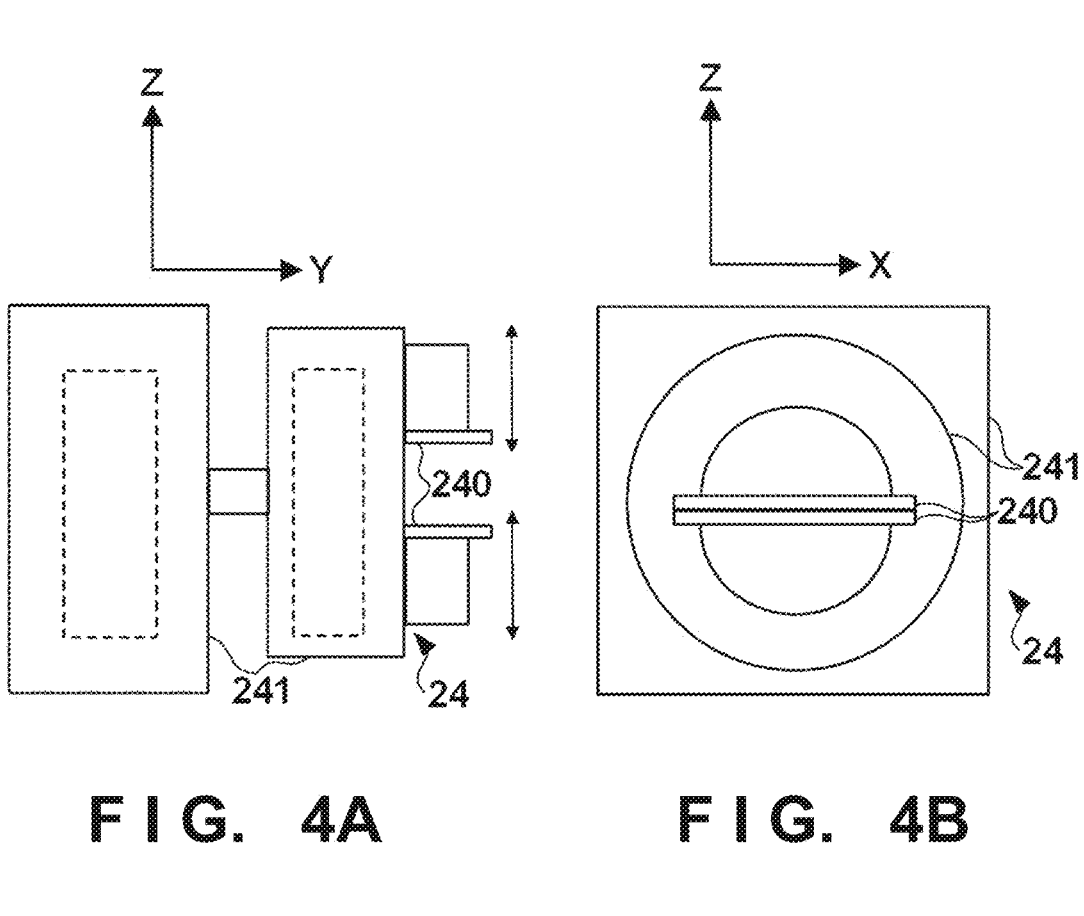
F I G. 4A
F I G. 4B
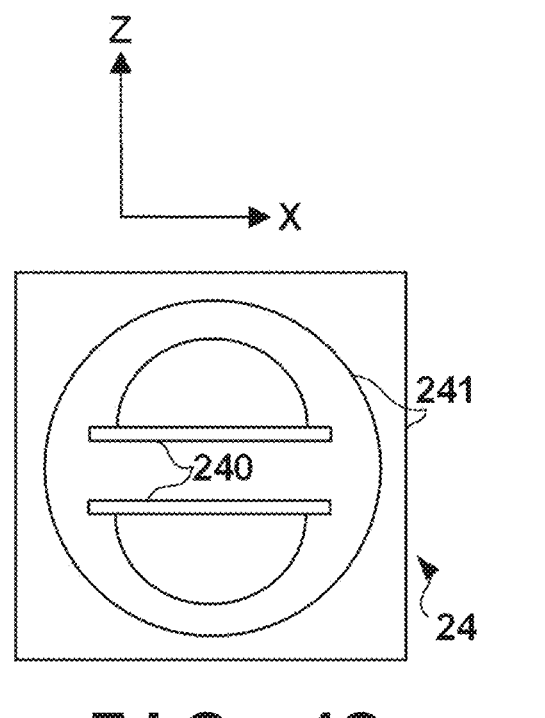
F I G. 4C
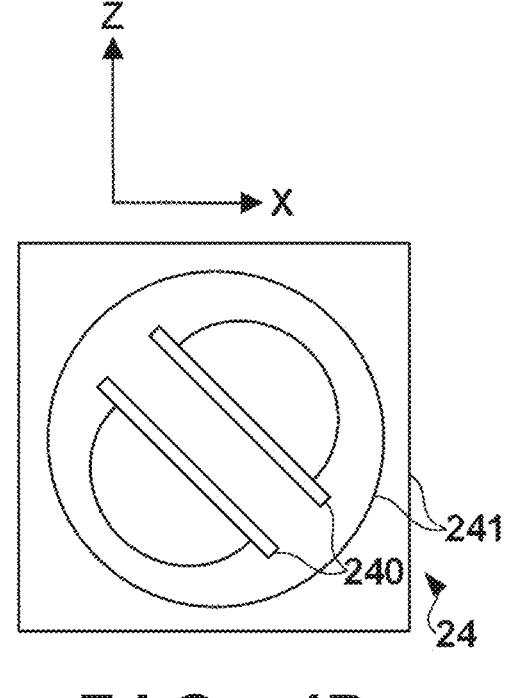
F I G. 4D

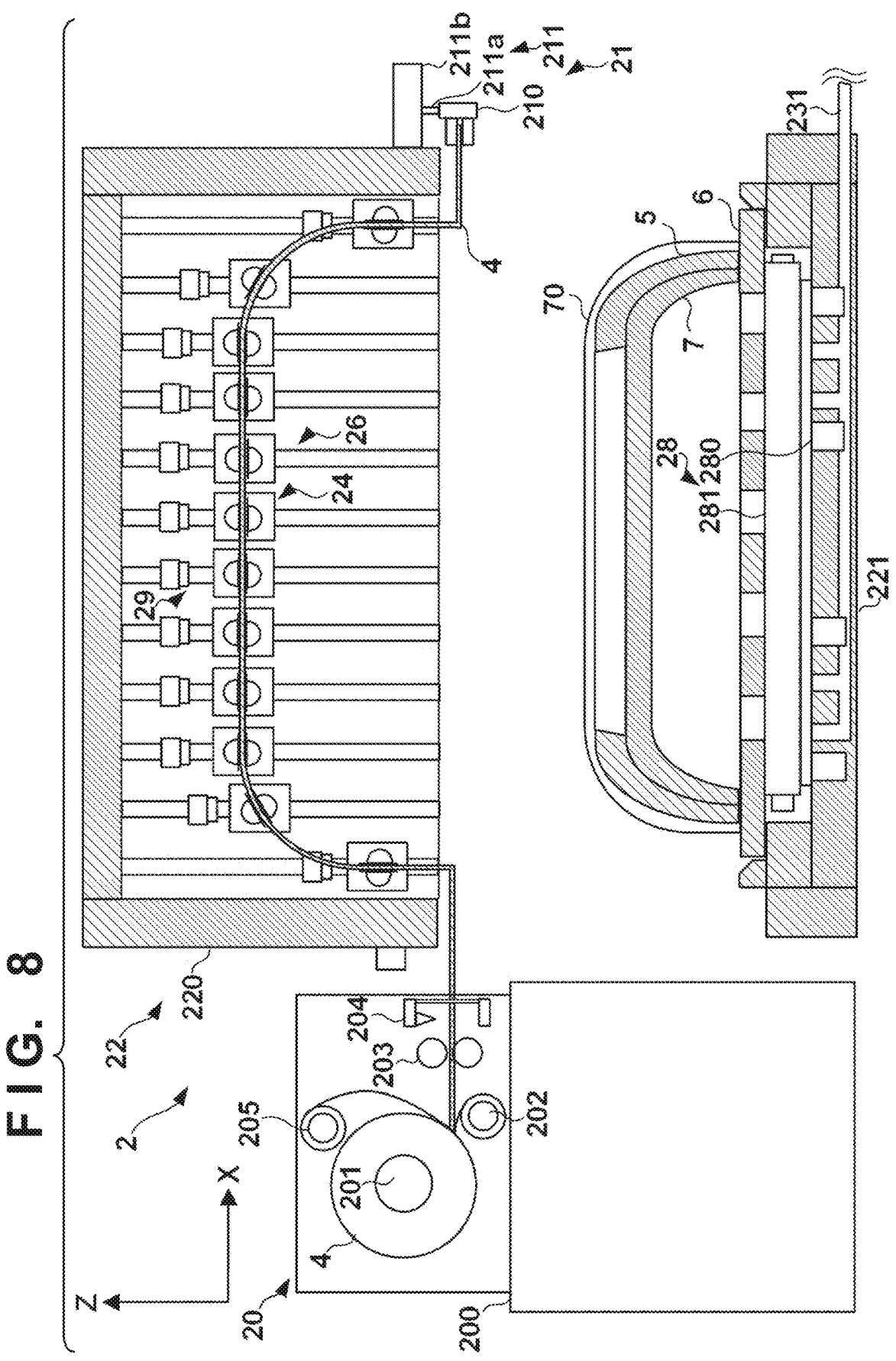
F I G. 8

F I G. 14
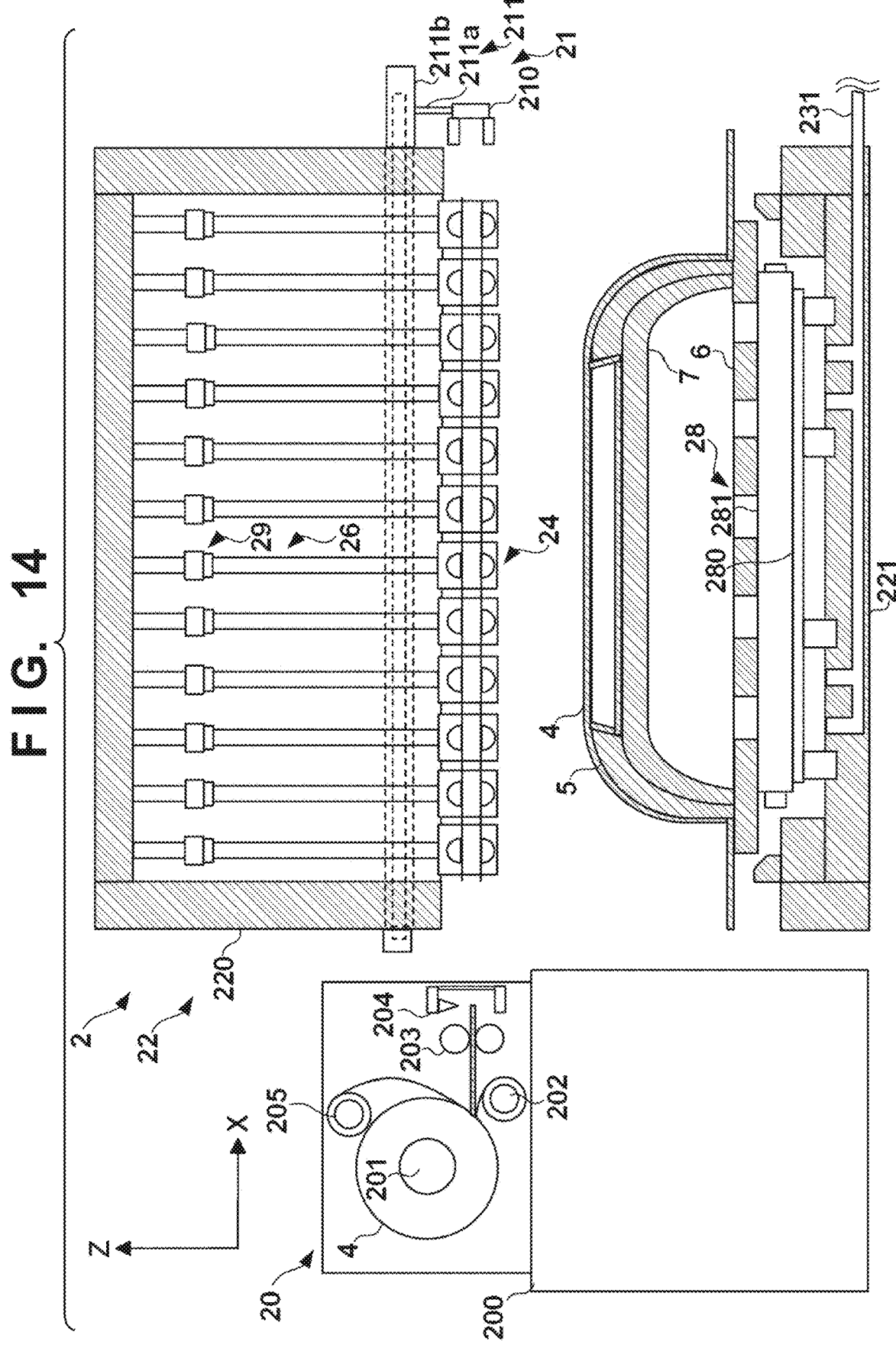

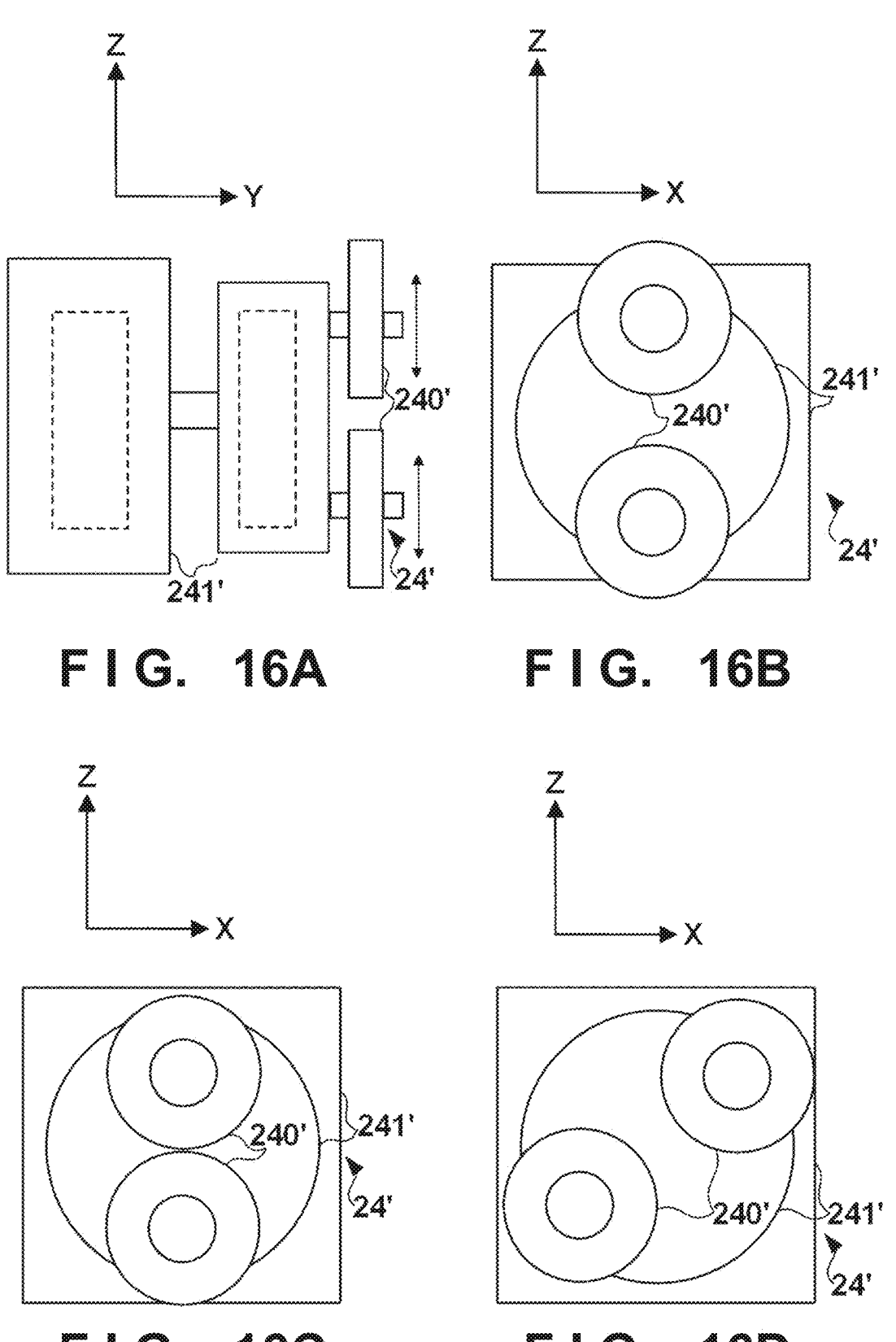
F I G.  16A
F I G.  16B
F I G.  16C
F I G.  16D

COATING APPARATUS

CROSS-REFERENCE TO RELATED APPLICATION(S)

This application claims priority to and the benefit of Japanese Patent Application No. 2023-100248 filed Jun. 19, 2023, the entire disclosure of which is incorporated herein by reference.

BACKGROUND OF THE INVENTION

Field of the Invention

The present invention relates to a coating apparatus.

Description of the Related Art

A molding method is known in which a work to be coated that has a three-dimensional shape is coated with a film. For example, Japanese Patent Laid-Open No. 2021-62625 discloses a method for coating an automobile or the like with a film stretched out in a flat planar shape.

When a work to be coated that has a three-dimensional shape is coated with a film stretched out in a flat planar shape, the distance between the work to be coated and the film varies depending on the part of the work to be coated, whereby the amount of stretch of the film changes, causing wrinkles.

SUMMARY OF THE INVENTION

An object of the present invention is to suppress variation in the amount of stretch of a film depending on the part of a work to be coated.

According to the present invention, there is provides a coating apparatus comprising: a plurality of first gripping units configured to grip a first side of a film conveyed above a work to be coated, the plurality of first gripping units being aligned along the first side; a plurality of second gripping units configured to grip a second side of the film opposing the first side, the second gripping units being aligned along the second side; and an elevating unit configured to raise and lower the plurality of first gripping units and the plurality of second gripping units along a shape of the work to be coated.

Further features of the present invention will become apparent from the following description of exemplary embodiments (with reference to the attached drawings).

BRIEF DESCRIPTION OF THE DRAWINGS

FIGS. 4A to 4D are explanatory diagrams of a configuration of a gripping unit.

FIG. 8 is an explanatory diagram of an operation of the coating apparatus.

FIG. 14 is an explanatory diagram of an operation of the coating apparatus.

FIGS. 16A to 16D are explanatory diagrams of another configuration of the gripping unit.

DESCRIPTION OF THE EMBODIMENTS

Figure 1:
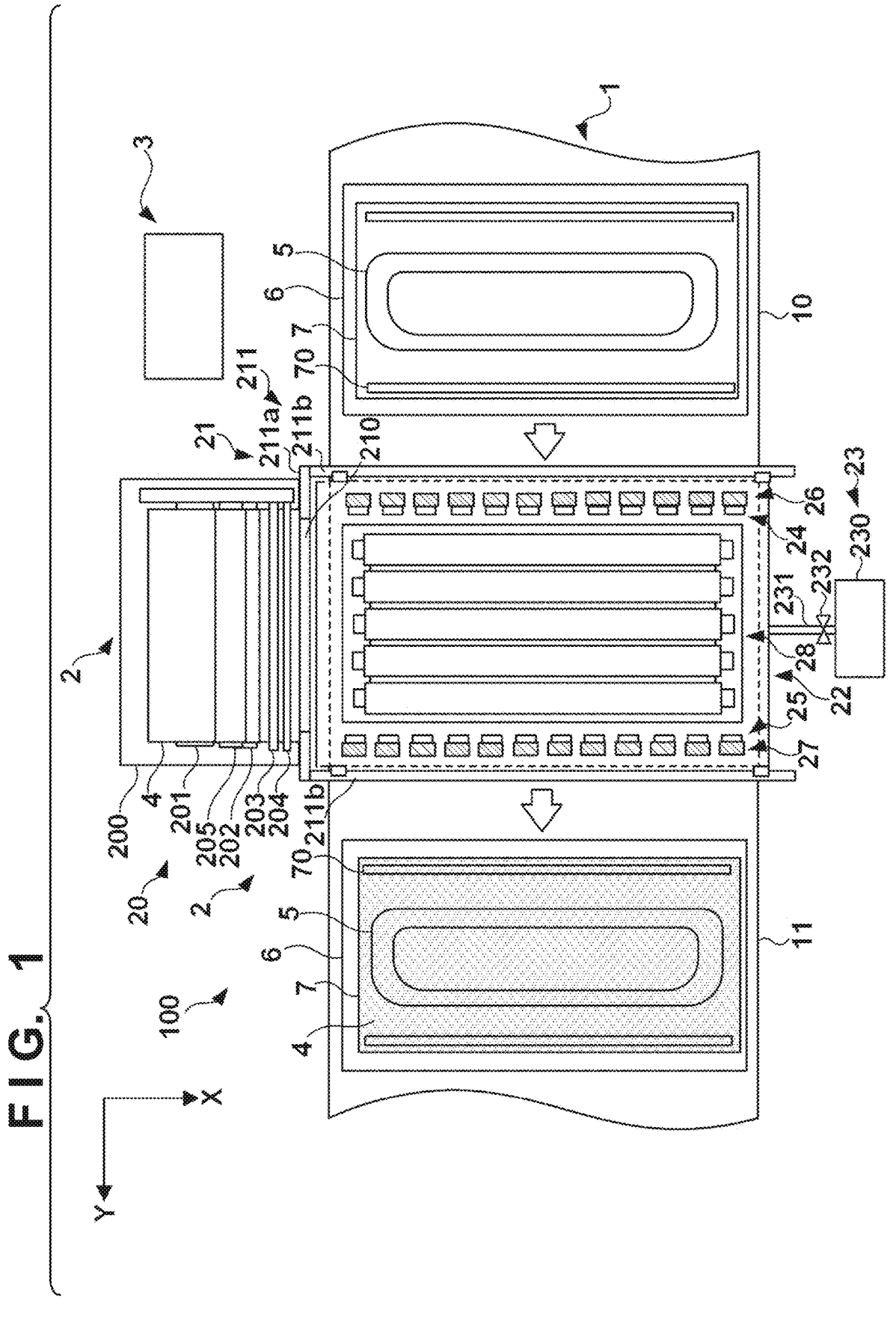
FIG. 1 is a schematic diagram of part of a production line.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Configuration of Production Line

FIG. 1 is a schematic diagram showing part of a configuration of a production line 100 to which a coating apparatus 2 of the present invention can be applied. In each drawing, arrows X and Y indicate horizontal directions that are perpendicular to each other, and arrow Z indicates an up-down direction (height direction of the coating apparatus). In this embodiment, a work to be coated 5 is described as being a component such as a front bumper or rear bumper of a vehicle (e.g., a four-wheeled vehicle), but the work to be coated 5 is not limited to these, and the present invention can be applied to various objects.

The production line 100 includes a conveying system 1 for conveying the work to be coated 5, the coating apparatus 2 for coating the work to be coated 5 with a film 4, and a control apparatus 3 for performing overall control of the production line 100. The arrows in the drawing indicate the conveying direction. FIG. 1 shows a state in which a work to be coated 5 is conveyed from a conveying path 10 on an upstream side of the conveying system 1, and the work to be coated 5 is coated with the film 4 inside the coating apparatus 2, and thereafter conveyed to a conveying path 11 on a downstream side.

The conveying system 1 is, for example, a conveying apparatus such as a belt conveyor. The work to be coated 5 is conveyed by the conveying system 1 while being held by a jig 7 placed on a conveying platform 6 such as a pallet. The conveying system 1 may further include, for example, a conveying position adjustment unit or the like that adjusts the conveying position of the conveying platform 6. Also, the conveying system 1 is not limited to the conveying apparatus described above, and the work to be coated 5 may also be conveyed using a robot arm or the like.

The coating apparatus 2 is a device that coats the work to be coated 5 with the film 4, using a later-described configuration. In this embodiment, the work to be coated 5, which is a member such as a vehicle bumper, is coated with the film 4. This makes it possible to easily decorate a member of a vehicle by, for example, changing the color of the film 4 in accordance with the vehicle color. Also, for example, by using a film 4 having a printed pattern such as a woodgrain pattern, or a texture such as metal, matte, or glass, it is possible to impart design properties to a member of a vehicle. Alternatively, by using a film 4 having functionality such as water repellency, weather resistance, heat shielding properties, and electromagnetic wave permeability, it is possible to impart functionality to a member of a vehicle.

The control apparatus 3 performs overall control of the production line 100. The control apparatus 3 includes a processing unit, a storage unit, an input/output interface (I/O), a communication unit, and the like. The processing unit is a processor represented by a CPU, and controls each apparatus on the production line 100 by executing programs stored in the storage unit. The storage unit is a storage device such as a ROM, a RAM, or an HDD, and stores various types of control information in addition to the programs to be executed by the processing unit. The I/O is an interface that transmits and receives signals between the processing unit and an external apparatus. The communication unit is a communication device that communicates with the above-mentioned apparatuses or other control apparatuses via a communication line.

The production line 100 is not limited to the configuration described above, and may also include, for example, a robot apparatus for replacing the work to be coated 5 or the jig 7 and the like, a dust removal apparatus for removing contamination from the work to be coated 5, a light irradiation unit for irradiating the work to be coated 5 and the film 4 with light such as ultraviolet light, a drying unit for drying the work to be coated 5 and the film 4, a trimming unit for partially removing the film 4 coating the work to be coated 5 using a laser or a trimming cutter, or the like.

Coating Apparatus

As shown in FIG. 1, the coating apparatus 2 in this embodiment includes a film support unit 20, a film conveying unit 21, a chamber 22, and an air pressure adjustment unit 23. In the coating apparatus 2, the film 4 supported by the film support unit 20 is conveyed into the chamber 22 by the film conveying unit 21. The dotted line portion of the chamber 22 shown in FIG. 1 represents the inside of the chamber 22. The coating apparatus 2 includes the configuration described below inside the chamber 22, and coats the work to be coated 5 with the film 4. During coating, the air pressure inside the chamber 22 is adjusted by the air pressure adjustment unit 23.

Figure 2:
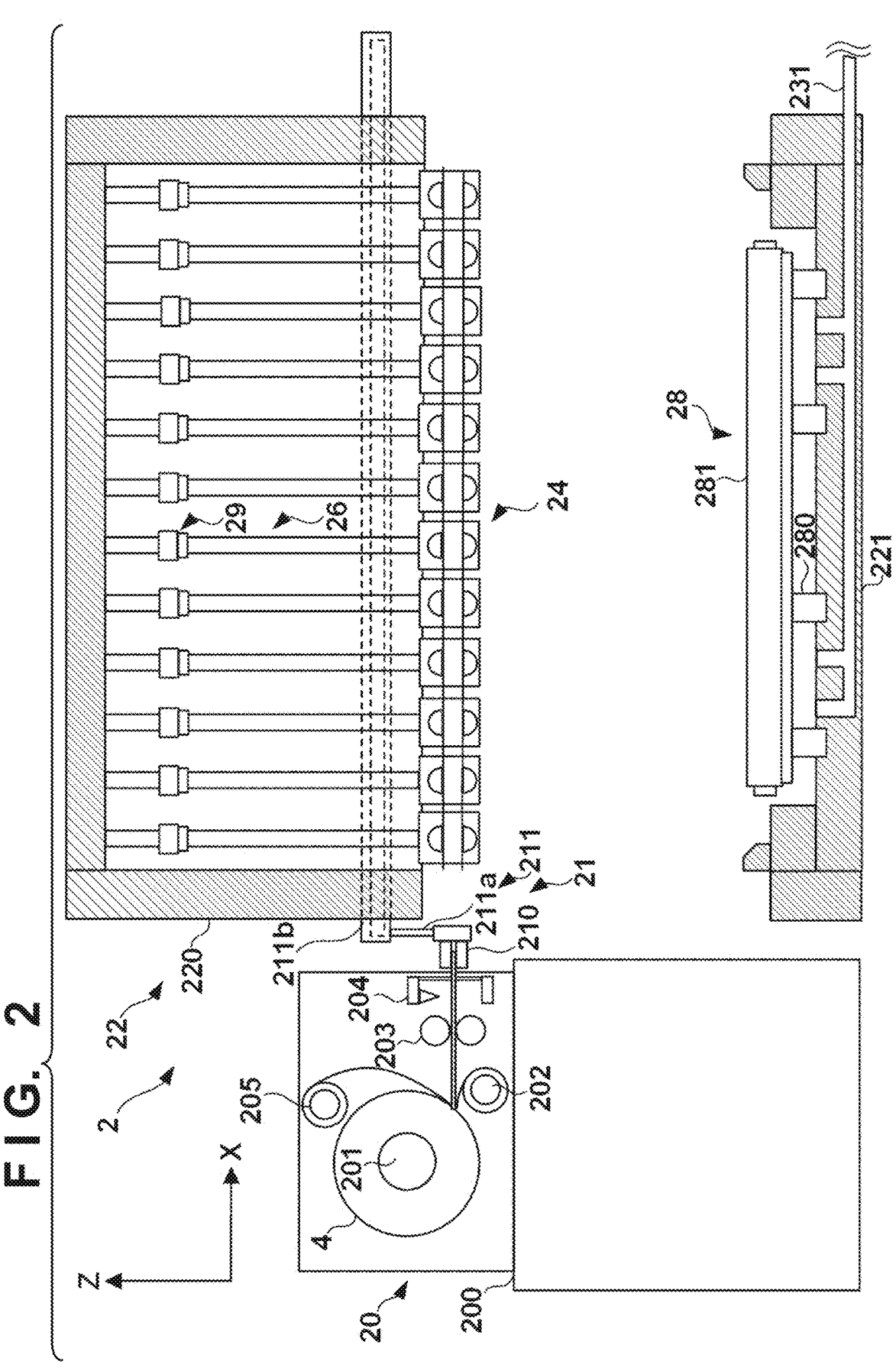
FIG. 2 is a schematic diagram of a coating apparatus according to one embodiment of the present invention.
Figure 3:
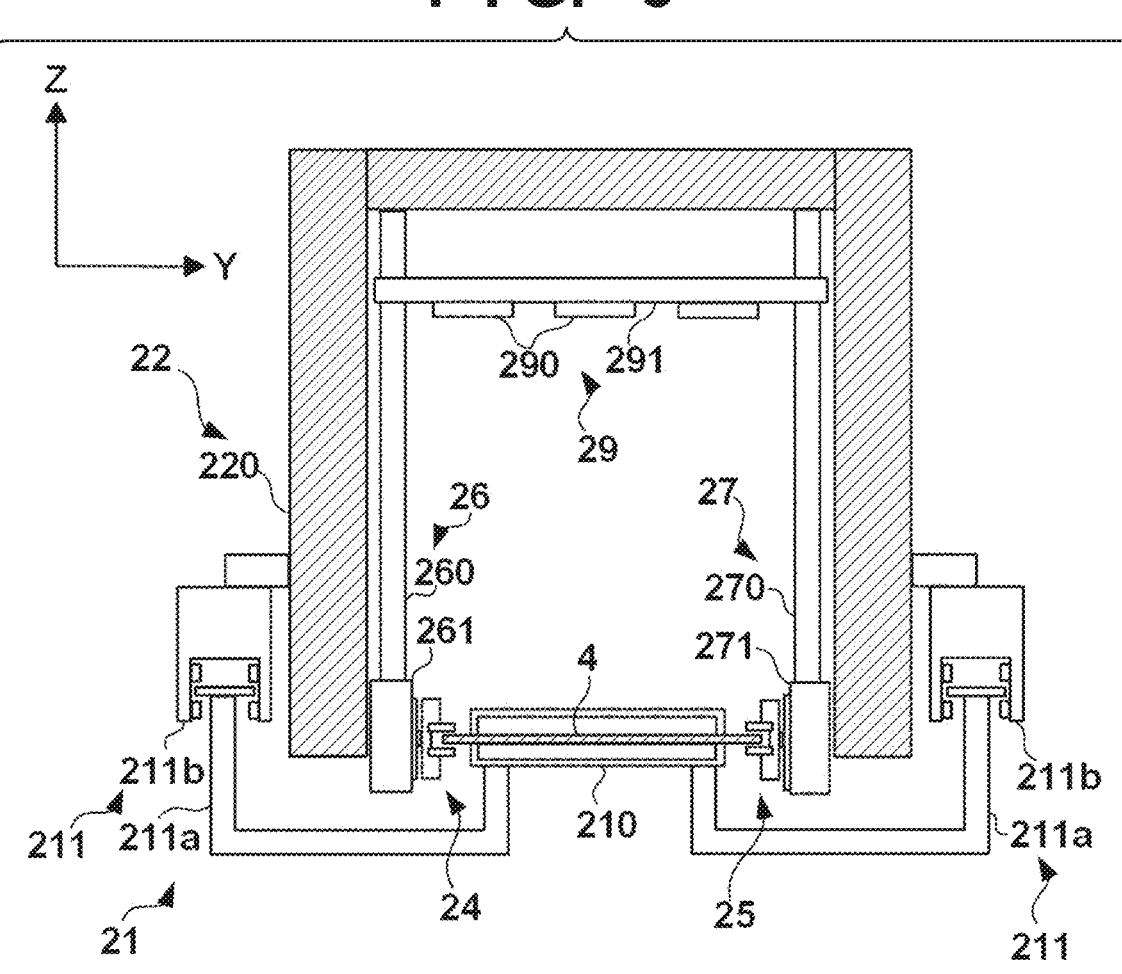
FIG. 3 is a schematic diagram of a coating apparatus according to one embodiment of the present invention.
Figure 3:
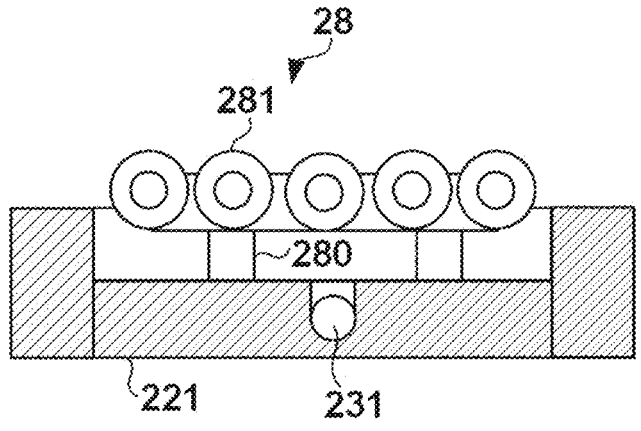

The configurations of the coating apparatus 2 will be described below with reference to FIGS. 2 and 3, in addition to FIG. 1. FIG. 2 is a schematic diagram showing part of a cross section of the coating apparatus 2 in the conveying direction of the film 4. FIG. 3 is a schematic diagram showing part of a cross section of the coating apparatus 2 in the conveying direction of the work to be coated 5. In the following description, for convenience, the conveying direction of the film 4 is referred to as the X direction, and the conveying direction of the work to be coated 5 is referred to as the Y direction in some cases.

The film support unit 20 supports the film 4 that is to coat the work to be coated 5. As shown in FIGS. 1 and 2, the film support unit 20 includes a support platform 200, a support shaft 201, a winding shaft 202, a guide shaft 203, a cutter 204, a winding shaft 205, and the like. The support shaft 201 provided on the support platform 200 is a shaft that rotatably supports the film 4 wound in a roll shape. The winding shaft 202 and the winding shaft 205 are shafts for winding a mold-release film, for example, when the front and back surfaces of the film 4 that is to coat the work to be coated 5 are laminated with a mold-release film, or the like. The guide shaft 203 is a shaft that pulls out the film 4 supported by the support shaft 201 and supplies the film 4 horizontally. The cutter 204 cuts the film 4 after the film 4 is conveyed by the later-described film conveying unit 21. The cutter 204 may cut the film 4 by, for example, sliding a trimming cutter, a laser, or the like in the width direction of the film 4. The width direction of the film 4 is the axial direction of the roll-shaped film 4.

As the film 4, for example, a film including a layer of thermoplastic resin may be used. A layer of thermoplastic resin may be formed from, for example, a plurality of types of thermoplastic resins. Also, the layer of thermoplastic resin may contain additives such as an anti-blocking agent, a lubricant, an antioxidant, a light stabilizer, a pigment, a dye, and an inorganic substance. The film 4 may also include a vapor deposited layer, a printed layer, a peeling layer, and the like. Furthermore, for example, one surface of the film 4 may be coated with an adhesive or the like. The film 4 may also be laminated with, for example, a peelable protective film. Also, minute patterns, recesses and protrusions, and the like may be formed on the surface of the film 4 through shaping, laser machining, or the like.

The film conveying unit 21 conveys the film 4 above the work to be coated 5 conveyed inside the chamber 22. As shown in FIG. 2, the film conveying unit 21 includes a leading end gripping portion 210 and a film moving mechanism 211. The leading end gripping portion 210 is switchable between a gripping state of gripping the leading end of the roll-shaped film 4 pulled out in a direction perpendicular to the axial direction, and a release state of not gripping but releasing the leading end of the film 4.

As shown in FIGS. 2 and 3, the film conveying unit 21 is provided in a later-described upper chamber 220, and is raised and lowered in the up-down direction of the coating apparatus 2 together with the upper chamber 220. As shown in FIG. 3, the film moving mechanism 211 includes a leading end support member 211a that movably supports the leading end gripping portion 210, and an actuator 211b that is arranged on both side walls of the upper chamber 220. As shown in FIG. 2, the actuator 211b is provided horizontally along the conveying direction of the film 4. The conveying direction of the film 4 is a direction perpendicular to the axial direction of the roll-shaped film 4. The actuator 211b may be, for example, an electric cylinder or an electric ball screw mechanism. This allows the leading end gripping portion 210 supported by the leading end support member 211a to pull out the film 4 horizontally. The length of actuator 211b is longer than the length of the upper chamber 220 in the conveying direction of the film 4, as shown in FIG. 2. This can prevent the leading end gripping portion 210 from coming into contact with the lower chamber 221 when the upper chamber 220 is lowered.

The chamber 22 is a box-shaped apparatus inside of which a vacuum atmosphere can be maintained. As shown in FIGS. 2 and 3, the chamber 22 includes an upper chamber 220 with an open bottom surface and a lower chamber 221 with an open top surface. The upper chamber 220 can be raised and lowered in the up-down direction of the coating apparatus 2, and for example, is raised and lowered by an actuator (not shown) such as an electric cylinder or an electric ball screw mechanism provided on the outer walls of the lower chamber 221 and the upper chamber 220. When the work to be coated 5 or the film 4 is conveyed, the upper chamber 220 is raised to be spaced apart from the lower chamber 221 as shown in FIG. 2. Also, when the air pressure inside the chamber 22 is adjusted by the air pressure adjustment unit 23 described below, the upper chamber 220 is lowered to come into contact with the lower chamber 221, whereby the inside of chamber 22 can be kept airtight (see FIGS. 10 to 13).

As shown in FIG. 1, the coating apparatus 2 includes, inside the chamber 22, a plurality of first gripping units 24, a plurality of second gripping units 25, a plurality of first elevating units 26, a plurality of second elevating units 27, and a work elevating unit 28. Also, as shown in FIGS. 2 and 3, the coating apparatus 2 includes a plurality of heating units 29 inside the chamber 22.

As shown in FIG. 1, a plurality of first gripping units 24 and a plurality of second gripping units 25 are aligned along the film conveying direction, and grip the film 4 conveyed by film conveying unit 21. The plurality of first gripping units 24 and the plurality of second gripping units 25 are arranged at positions opposing each other. The plurality of first gripping units 24 grip a side of the film 4. The plurality of second gripping units 25 grip a side of the film 4 opposite to the side gripped by the plurality of first gripping units 24.

As shown in FIG. 2, the plurality of first gripping units 24 are provided on the later-described plurality of first elevating units 26 and can be raised and lowered in the up-down direction of the coating apparatus 2. FIG. 2 shows an example of the configuration of the plurality of first gripping units 24, but as shown in FIG. 3, the plurality of second gripping units 25 also have a configuration similar to the configuration of the plurality of first gripping units 24 shown in FIG. 2. That is, the plurality of second gripping units 25 are provided on the plurality of second elevating units 27 and can be raised and lowered in the up-down direction of the coating apparatus 2.

Each of the plurality of first gripping units 24 and the plurality of second gripping units 25 will be described with reference to FIGS. 4A to 4D. In FIGS. 4A to 4D, a gripping unit 24 will be described, but a gripping unit 25 has a similar configuration. FIG. 4A is a schematic diagram of the gripping unit 24 as viewed in the X direction, and corresponds to an enlarged view of one of the gripping units 24 in FIG. 3. FIGS. 4B to 4D are schematic diagrams of the gripping unit 24 as viewed in the Y direction, and correspond to enlarged views of the gripping unit 24 in FIG. 2.

As shown in FIG. 4A, the gripping unit 24 includes gripping portions 240 and support portions 241. The gripping portions 240 in this embodiment are a pair of plate-shaped elastic members that sandwich the film 4. The elastic member may be, for example, a plate-shaped member made of a thermoplastic resin, a thermosetting resin, or the like. By sandwiching the film 4 between the elastic members, even if the plurality of first gripping units 24 and the plurality of second gripping units 25 are raised and lowered and the film curves, the film can be gripped along the curved shape of the film.

The gripping portion 240 in this embodiment can switch between a gripping state of gripping the film 4 as shown in FIG. 4B and a release state of not gripping but releasing the film 4 as shown in FIG. 4C. In other words, the gripping state is a state in which the gripping portions 240 are closed, and the release state is, in other words, in a state in which the gripping portions 240 are open. Switching between the gripping state and the release state of the gripping portions 240 may also be controlled by, for example, an actuator or the like provided inside the support portion 241 as shown in FIG. 4A. The actuator may be an electric cylinder, an electric ball screw mechanism, or the like. By configuring the gripping portions 240 to be switchable between the gripping state and the release state, the shape of the film 4 is easily adjusted by raising and lowering the plurality of first gripping units 24 and the plurality of second gripping units 25.

The gripping portions 240 in this embodiment may also be rotatable about the Y direction. The support portions 241 may include, for example, a rotation shaft as shown in FIG. 4A. Also, the rotation of the rotation shaft may be controlled by an actuator provided in the support portions 241. Since the gripping portions 240 are rotatable, each of the gripping units 24 and 25 can adjust the orientation of gripping the film 4 when the plurality of first gripping units 24 and the plurality of second gripping units 25 are raised and lowered. In other words, the orientation of gripping the film 4 is the angle of the gripping portion 240 with respect to the X direction when gripping the film 4.

As shown in FIG. 1, the plurality of first elevating units 26 are aligned along a side of the film 4 being conveyed into the chamber 22, and the plurality of second elevating units 27 are aligned along a side opposing the side of the film 4 on the plurality of first elevating units 26 side. The plurality of first elevating units 26 and the plurality of second elevating units 27 are arranged at positions opposing each other.

As shown in FIGS. 2 and 3, the plurality of first elevating units 26 have a plurality of first support members 261 that individually support the plurality of first gripping units 24, and a plurality of first moving mechanisms 260 that individually move the plurality of first support members 261 in the up-down direction. Although FIG. 2 shows a configuration of the plurality of first elevating units 26, the plurality of second elevating units 27 also have a similar configuration. That is, the plurality of second elevating units 27 have a plurality of second support members 271 that individually support the plurality of second gripping units 25, and a plurality of second moving mechanisms 270 that individually move the plurality of second support members 271 in the up-down direction (see FIG. 3). The plurality of first moving mechanisms 260 and the plurality of second moving mechanisms 270 may also be actuators, for example. In this embodiment, the actuators are rod-shaped, and may be electric cylinders, electric ball screw mechanisms, or the like. Also, the plurality of first moving mechanisms 260 and the plurality of second moving mechanisms 270 may be members that can expand and contract in the up-down direction of the coating apparatus 2, for example.

The plurality of first elevating units 26 and the plurality of second elevating units 27 in this embodiment raise and lower sets of the first gripping units 24 and the second gripping units 25 arranged at positions opposing each other to the same heights as each other, among the plurality of the first gripping units 24 and the second gripping units 25 aligned at positions opposing each other (see FIG. 3). This makes it possible to adjust the height of the film 4 in the conveying direction in accordance with the shape of the work to be coated 5. Accordingly, compared to a case where the work to be coated 5 is coated with the film 4 while the film 4 is stretched out in a flat planar shape, the coating apparatus 2 in this embodiment can suppress changes in the amount of stretch of the film 4 depending on the part of the work to be coated 5.

Also, among the plurality of first gripping units 24 and the plurality of second gripping units 25 aligned at positions opposing each other, sets of the first gripping units 24 and the second gripping units 25 arranged at positions opposing each other (at the same positions in the X direction) may be raised and lowered to different heights (see FIG. 3). This allows the shape of the film 4 to be adjusted to suit various shapes of the work to be coated 5.

The raising and lowering of the plurality of first elevating units 26 and the plurality of second elevating units 27 may be controlled by the control apparatus 3, for example, by measuring the shape of the work to be coated 5 in advance and storing the height of each part of the work to be coated 5 in the control apparatus 3. Alternatively, a detection unit such as a sensor for detecting the shape of the work to be coated 5 may be further provided inside the chamber 22 or in each of the elevating units 26 and 27, and the elevating units 26 and 27 may be raised or lowered according to the detection result of the detection unit.

The work elevating unit 28 includes a work elevating portion 280 and a work conveying portion 281 supported by the work elevating portion 280. The work elevating portion 280 can raise and lower the work to be coated 5 carried into the chamber 22 in the up-down direction of the coating apparatus 2 to adjust the position of the work to be coated 5 or bring the work to be coated 5 into contact with the film 4. The work conveying portion 281 conveys the work to be coated 5 using a plurality of rotatable shafts. The work elevating portion 280 and the work conveying portion 281 may be, for example, actuators such as electric cylinders or electric ball screw mechanisms.

The plurality of heating units 29 heat the film 4 conveyed inside the chamber 22. As shown in FIG. 3, each heating unit 29 is arranged to correspond to a set of a first gripping unit and a second gripping unit arranged opposing each other, is movable up and down, and can be adjusted. By heating the film 4 with the plurality of heating units 29, the conformability of the film 4 to the work to be coated 5 can be improved.

Each heating unit 29 of the plurality of heating units 29 includes heating elements 290 and a support plate 291 that supports the heating elements 290. The support plate 291 is provided on a first moving mechanism 260 that raises and lowers a first gripping unit 24 and a second moving mechanism 270 that raises and lowers a second gripping unit 25, which are arranged at positions opposing each other, and is raised and lowered in synchronization with the corresponding set of the first gripping unit 24 and the second gripping unit 25. Each heating unit 29 is raised and lowered in synchronization with the corresponding first gripping unit 24 and second gripping unit 25, whereby the distance between each heating unit 29 and the film 4 can be kept constant.

In this embodiment, a configuration has been described in which each heating unit 29 is provided on a first moving mechanism 260 that raises and lowers a first gripping unit 24 and a second moving mechanism 270 that raises and lowers a second gripping unit 25, which are arranged at positions opposing each other, but there is no limitation to this. For example, each of the heating units 29 may be arranged on a side surface, top surface, or the like inside of the upper chamber 220. Also, the heating unit 29 may be configured to adjust the heating position according to the shape of the film 4 using, for example, a deformable sheet-like heater such as a ceramic heater. Also, each heating unit 29 may be set to a different temperature.

The air pressure adjustment unit 23 includes an air pressure adjustment portion 230, a pipe 231, a valve 232, or the like, and adjusts the air pressure inside the chamber 22. The air pressure adjustment portion 230 includes, for example, a vacuum pump that reduces the pressure inside of the chamber 22 to create a vacuum state, and a compressor that increases the pressure inside of the chamber 22 with compressed air or the like. In this embodiment, the pipe 231 is connected to the lower chamber 221, and the pressure reduction or pressure increase by the air pressure adjustment portion 230 can be adjusted by opening and closing the valve 232. The air pressure adjustment unit 23 adjusts the air pressure inside the chamber 22 while the plurality of first gripping units 24 and the plurality of second gripping units 25 are gripping the film 4, and causes the film 4 to coat the work to be coated 5.

With the above configuration, in this embodiment, the plurality of first gripping units 24 are raised and lowered by the plurality of first elevating units 26, and the plurality of second gripping units 25 are raised and lowered by the plurality of second elevating units 27. As a result, the height of the film 4 gripped by the plurality of first gripping units 24 and the plurality of second gripping units 25 relative to the work to be coated 5 can be adjusted according to the shape of the work to be coated 5. Accordingly, compared to the case where a three-dimensional work to be coated 5 is coated with the film 4 while the film 4 is stretched out in a flat planar shape, it is possible to suppress a case in which the distance between the work to be coated 5 and the film 4 differs depending on the part of the work to be coated 5, and to suppress changes in the amount of stretch of the film 4. This makes it possible to suppress wrinkles from forming in the film 4.

Example of Operation of Coating Apparatus

An example of an operation in which the coating apparatus 2 coats the work to be coated 5 with the film 4 will be described. FIGS. 5 to 15 are diagrams for illustrating operations of the coating apparatus 2, and show an example of operations from the carrying-in of the film 4 and the work to be coated 5, to coating and carry-out.

Figure 5:
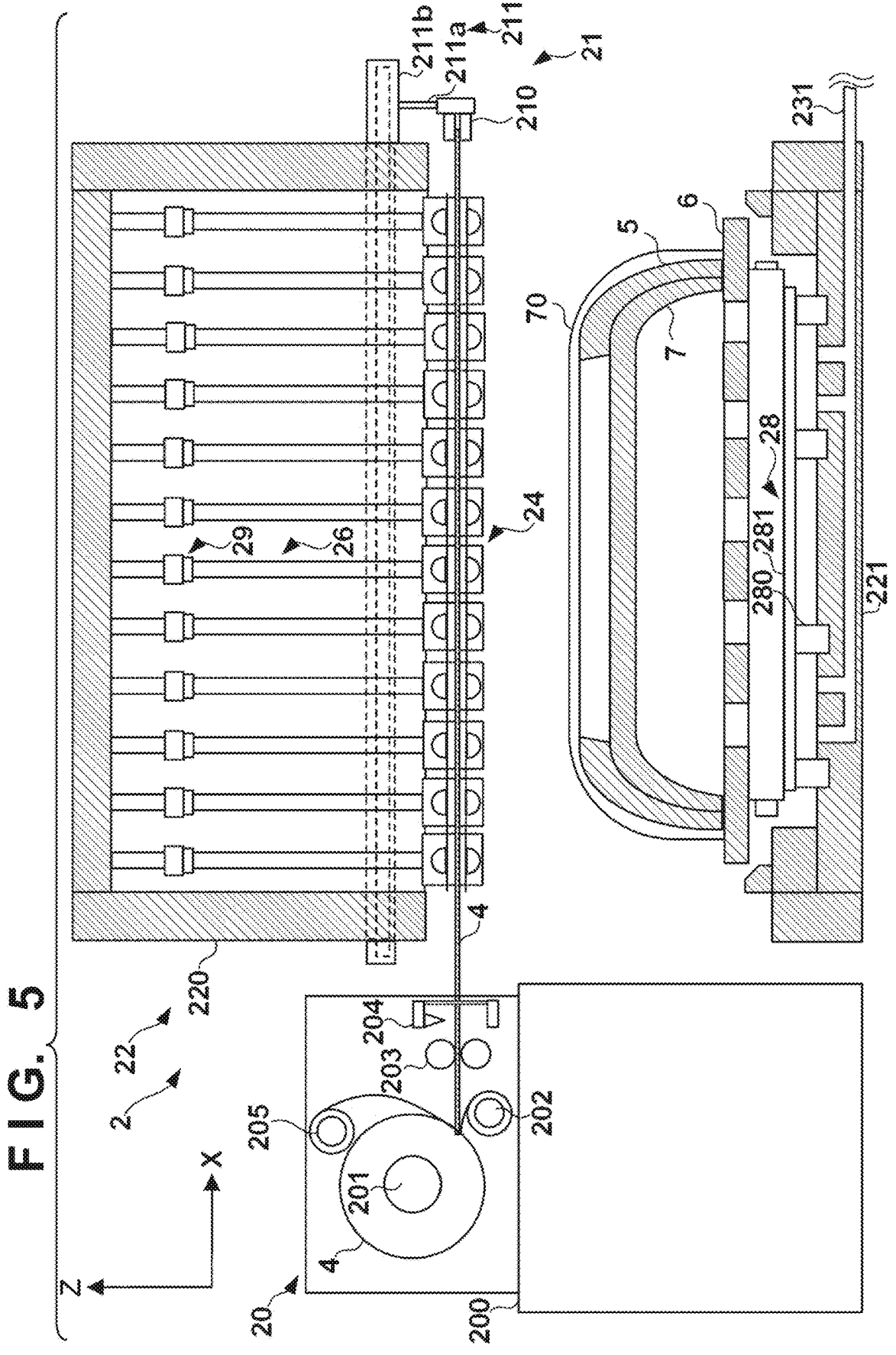
FIG. 5 is an explanatory diagram of an operation of the coating apparatus.
Figure 6:
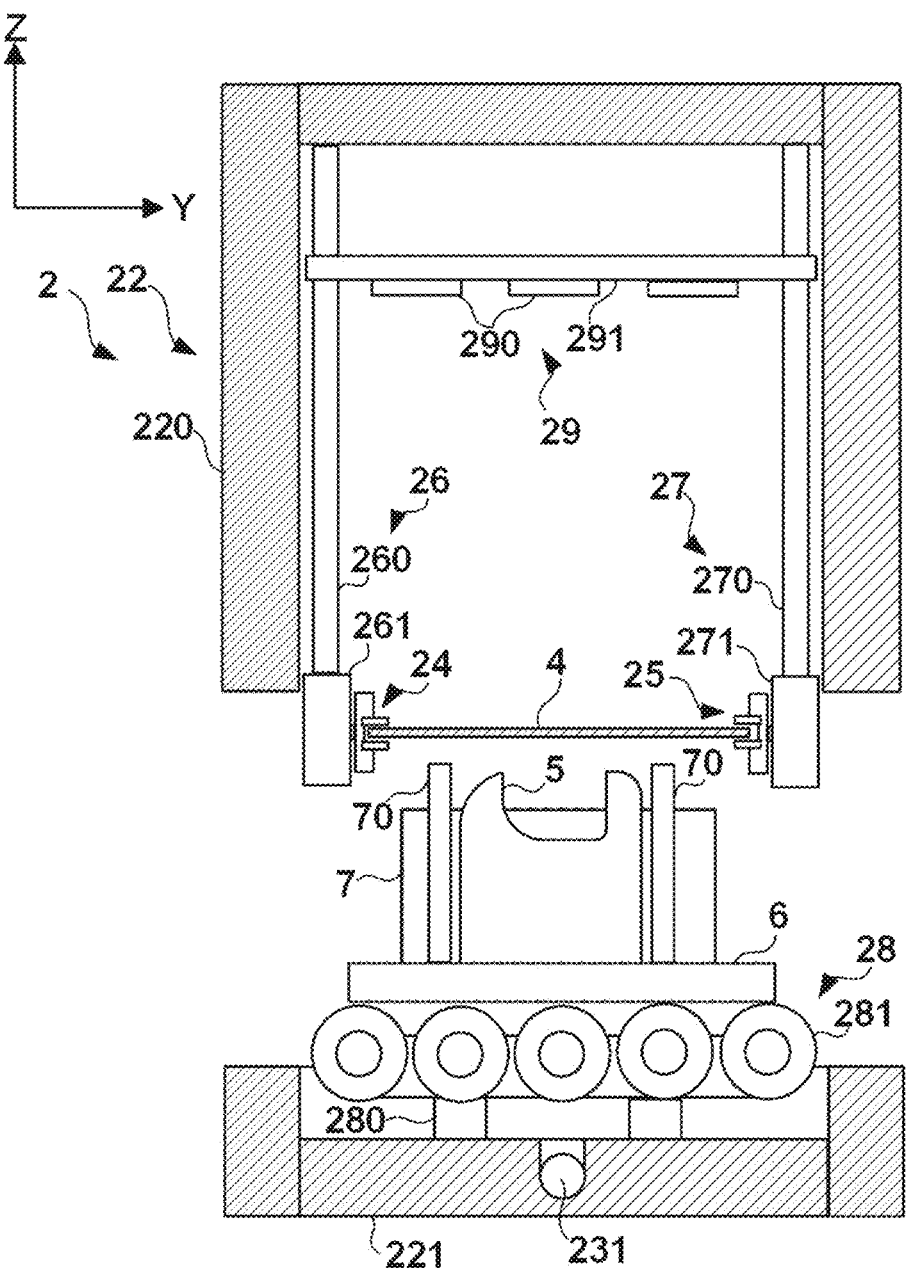
FIG. 6 is an explanatory diagram of an operation of the coating apparatus.

First, FIG. 5 and FIG. 6 will be referred to. FIG. 5 shows a state in which the work to be coated 5 and the film 4 have been conveyed inside the chamber 22. FIG. 6 shows the inside of the chamber 22 in the X direction of FIG. 5. As shown in FIGS. 5 and 6, the work to be coated 5 and the film 4 are conveyed while the upper chamber 220 is raised and the upper chamber 220 and the lower chamber 221 are spaced apart from each other.

The work to be coated 5 is carried onto the work elevating unit 28 provided in the lower chamber 221 by, for example, the above-mentioned conveying system 1 or the like. After the work to be coated 5 is carried into the chamber 22, its position may be adjusted by the work elevating unit 28. The film 4 is conveyed above the work to be coated 5 by the film conveying unit 21.

As shown in FIGS. 5 and 6, the film conveying unit 21 conveys the film 4 such that a side of the film 4 being conveyed passes through a path that can be gripped by the plurality of first gripping units 24, and the side opposing the side of the film 4 on the plurality of first gripping units 24 side passes through a path that can be gripped by the plurality of second gripping units 25. In this embodiment, when the film 4 is conveyed, the plurality of first gripping units 24 and the plurality of second gripping units 25 are aligned horizontally, and the film 4 is conveyed horizontally. This makes it possible to easily convey and grip the film 4 even in a configuration in which the film 4 is gripped at a plurality of positions.

Figure 7:
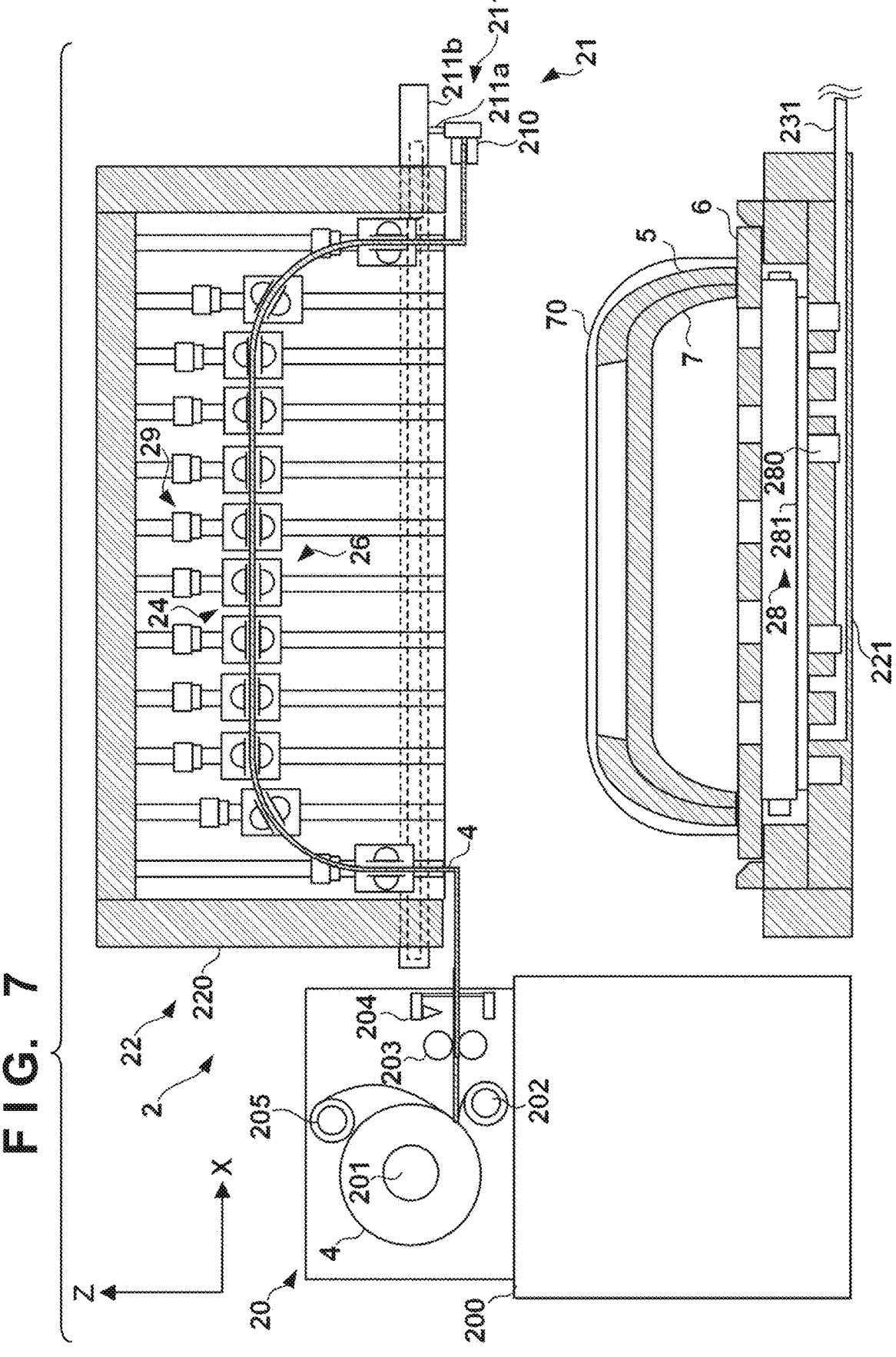
FIG. 7 is an explanatory diagram of an operation of the coating apparatus.
Figure 9:
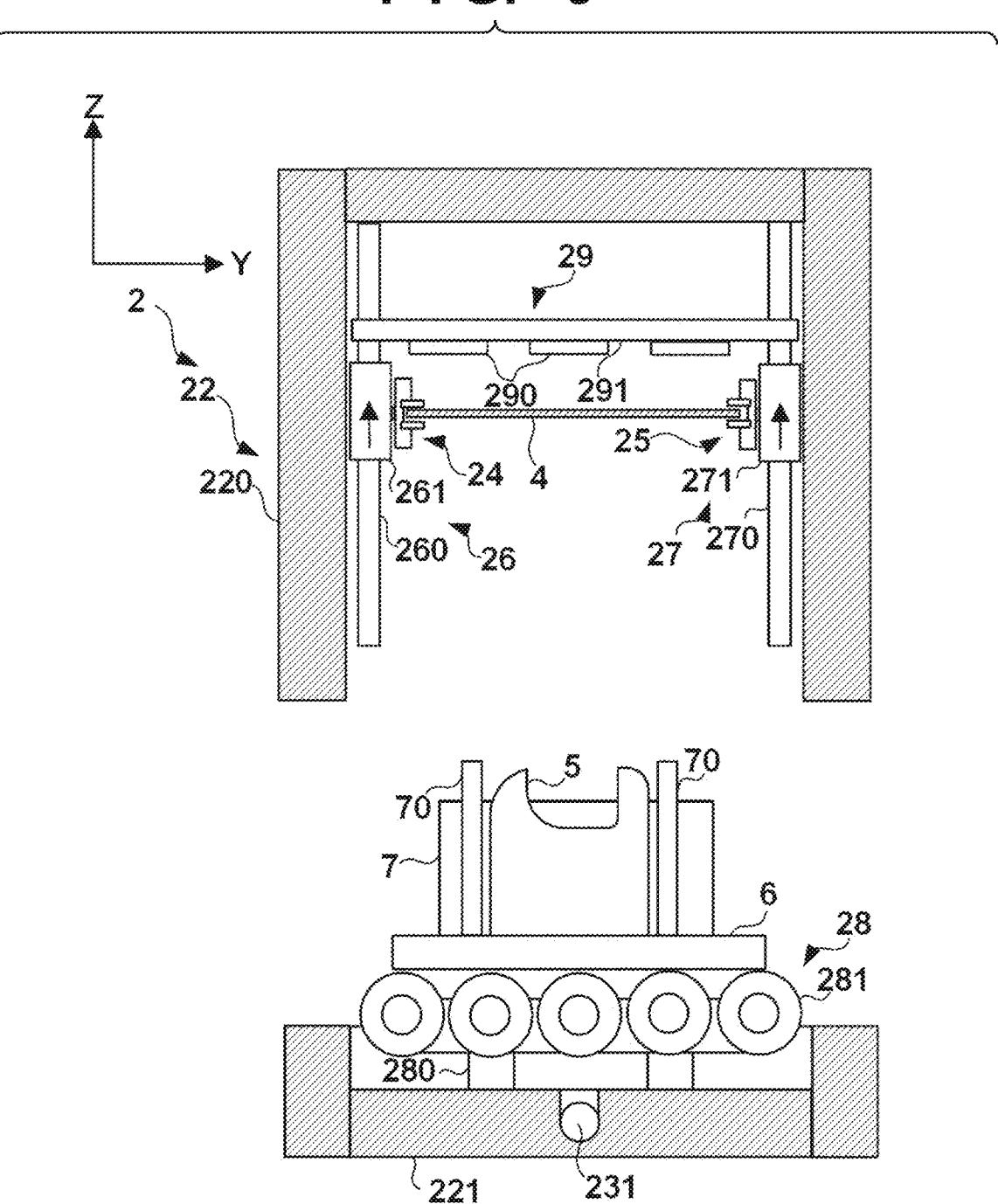
FIG. 9 is an explanatory diagram of an operation of the coating apparatus.

Next, FIGS. 7 to 9 will be referred to. FIGS. 7 and 8 show a state in which the film 4 conveyed inside the chamber 22 is raised and lowered according to the shape of the work to be coated 5. FIG. 9 shows the inside of the chamber 22 in the X direction of FIGS. 7 and 8. As shown in FIG. 7, the plurality of first elevating units 26 and the plurality of second elevating units 27 raise and lower the corresponding plurality of first gripping units 24 and plurality of second gripping units 25 according to the shape of the work to be coated 5. In this embodiment, when the plurality of first gripping units 24 are raised and lowered by the plurality of first elevating units 26, and when the plurality of second gripping units 25 are raised and lowered by the plurality of second elevating units 27, none of the gripping units 24 and 25 grips the film 4. That is, each of the gripping units 24 and 25 is in a release state.

As shown in FIGS. 7 and 9, the plurality of first elevating units 26 and the plurality of second elevating units 27 each raise and lower a set of a first gripping unit 24 and a second gripping unit 25 arranged at positions opposing each other to the same height, among the plurality of first gripping units 24 and the plurality of second gripping units 25 aligned at positions opposing each other.

As shown in FIG. 8, in this embodiment, after the plurality of first gripping units 24 and the plurality of second gripping units 25 are raised and lowered to heights corresponding to the shape of the work to be coated 5, the plurality of first gripping units 24 and the plurality of second gripping units 25 grip the film 4. That is, each of the gripping units 24 and 25 is in a gripping state. In the present embodiment, an example has been described in which the plurality of first gripping units 24 and the plurality of second gripping units 25 are in an open state when being raised and lowered, and are thereafter in a gripping state, but there is no limitation to this. For example, when the plurality of first gripping units 24 and the plurality of second gripping units 25 are raised and lowered, some of the gripping units 24 and 25 among the plurality of first gripping units 24 and the plurality of second gripping units 25 may be gripping the film 4. Also, the plurality of first gripping units 24 and the plurality of second gripping units 25 may grip with a weaker gripping force compared to the gripping state.

As shown in FIGS. 7 and 9, the heating units 29 are raised and lowered so as to maintain a certain distance in conjunction with the movement of the corresponding sets of the first gripping units 24 and the second gripping units 25. This allows the distance between the plurality of heating units 29 and the film 4 to be kept constant, and can prevent certain parts of the film 4 from being overheated or underheated when the later-described plurality of heating units 29 heat the film 4.

Figure 10:
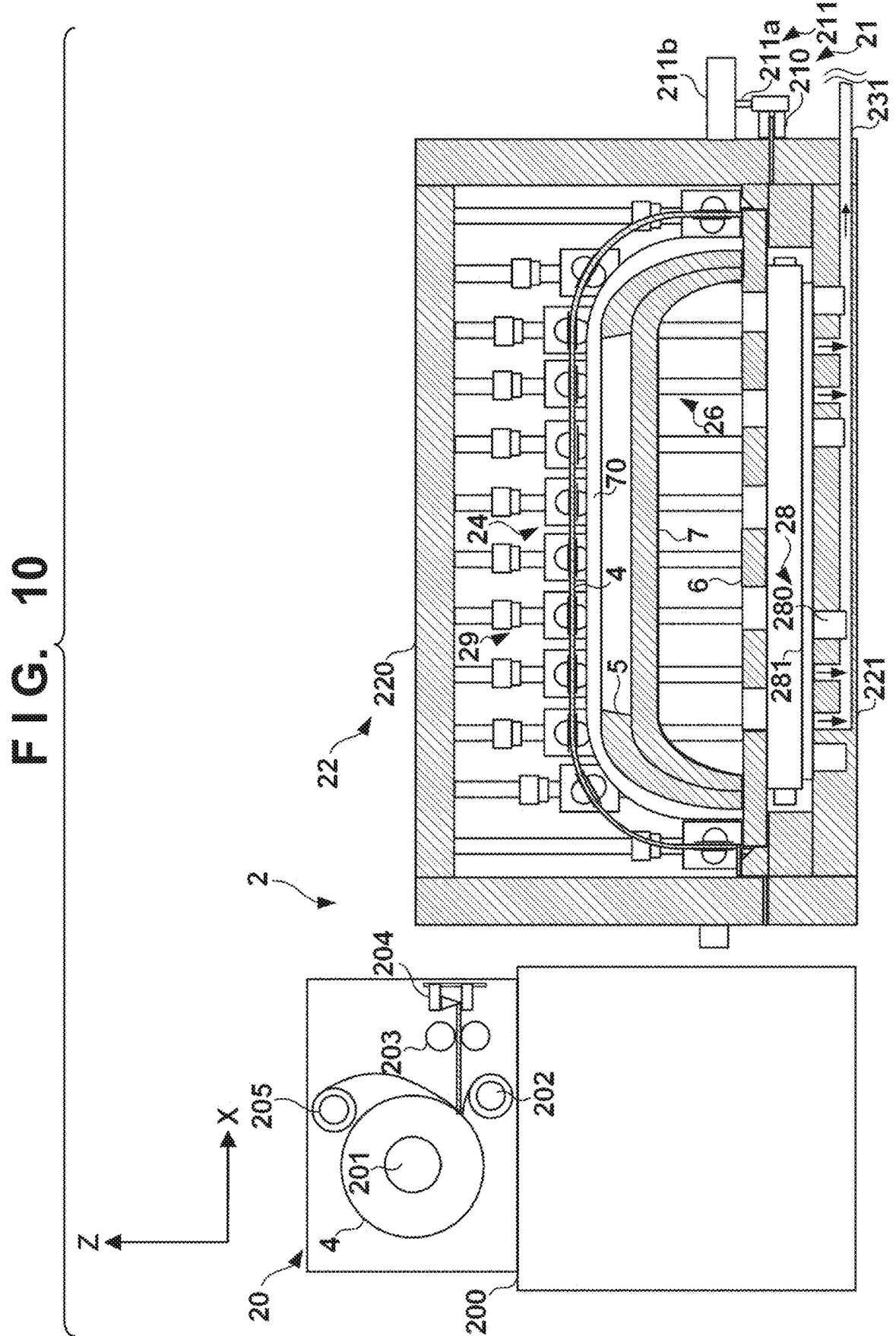
FIG. 10 is an explanatory diagram of an operation of the coating apparatus.
Figure 11:
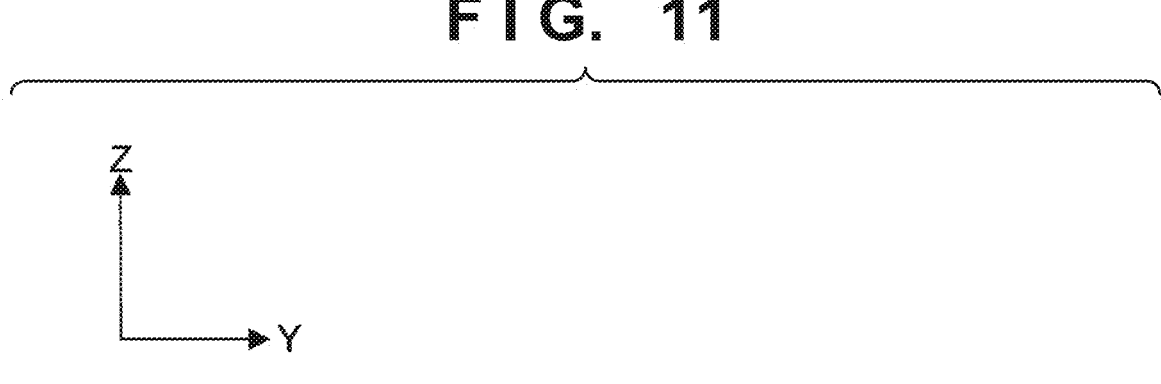
FIG. 11 is an explanatory diagram of an operation of the coating apparatus.
Figure 11:
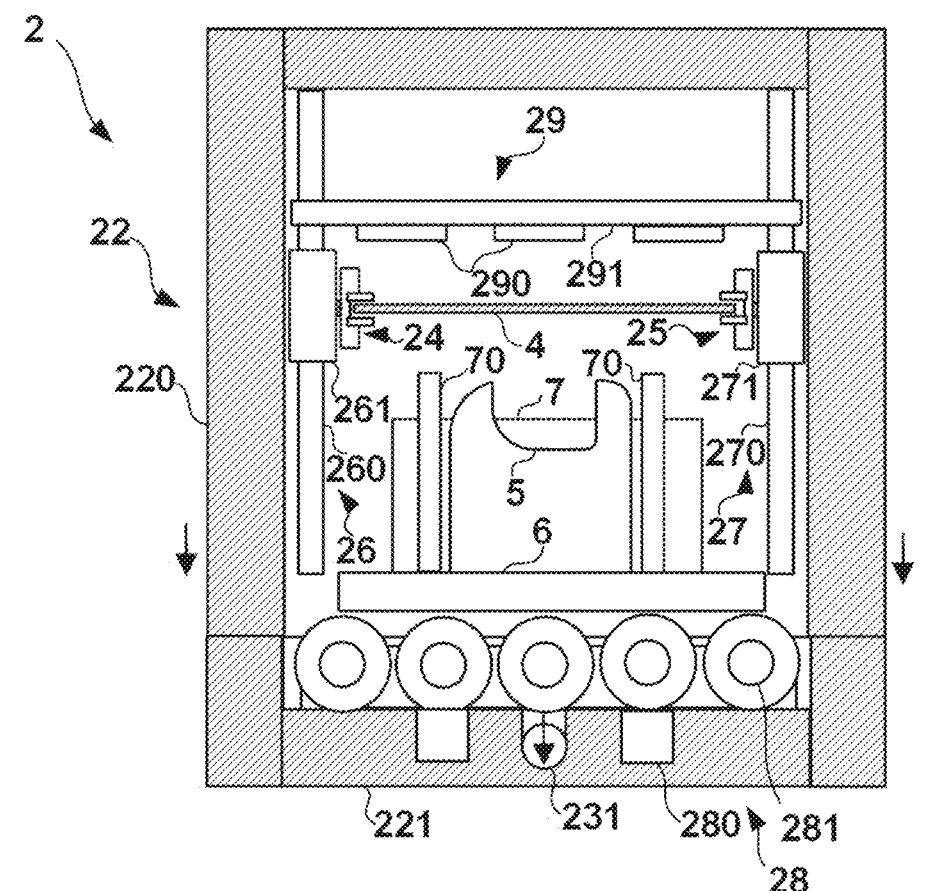

Next, FIGS. 10 and 11 will be referred to. FIG. 10 shows a state in which the upper chamber 220 is lowered after the heights of the first gripping units 24 and the second gripping units 25 in FIG. 7 are adjusted. FIG. 11 shows the inside of the chamber 22 in the X direction of FIG. 10. When the upper chamber 220 is lowered, the film 4 may be cut by the cutter 204, as shown in FIG. 10, for example. Due to the upper chamber 220 being lowered to come into contact with the lower chamber 221, the inner space surrounded by the upper chamber 220 and the lower chamber 221 can be kept sealed.

As shown in FIGS. 10 and 11, the pressure inside the chamber 22 is reduced by the air pressure adjustment unit 23 shown in FIG. 1 while the chamber 22 remains sealed. When the pressure is reduced, the plurality of first gripping units 24 and the plurality of second gripping units 25 are located at heights where the film 4 and the work to be coated 5 are separated from each other. This allows the pressure of the entire interior of the chamber 22 to be reduced.

In FIGS. 10 and 11, for example, after the pressure inside the chamber 22 is reduced, the film 4 is heated by the heating unit 29. The film 4 is softened by heating, and thus conformability to the work to be coated 5 can be improved.

Figure 12:
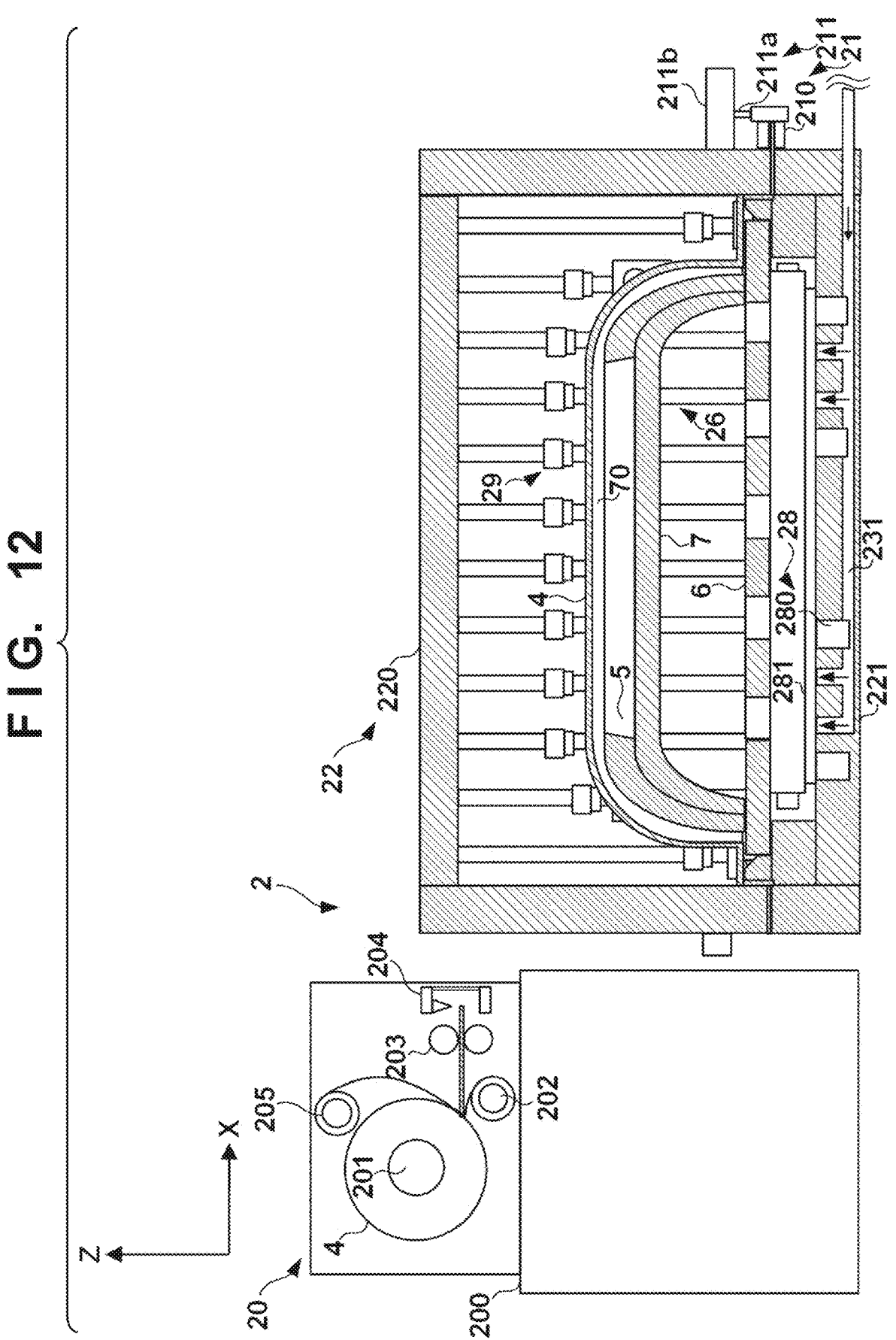
FIG. 12 is an explanatory diagram of an operation of the coating apparatus.
Figure 13:
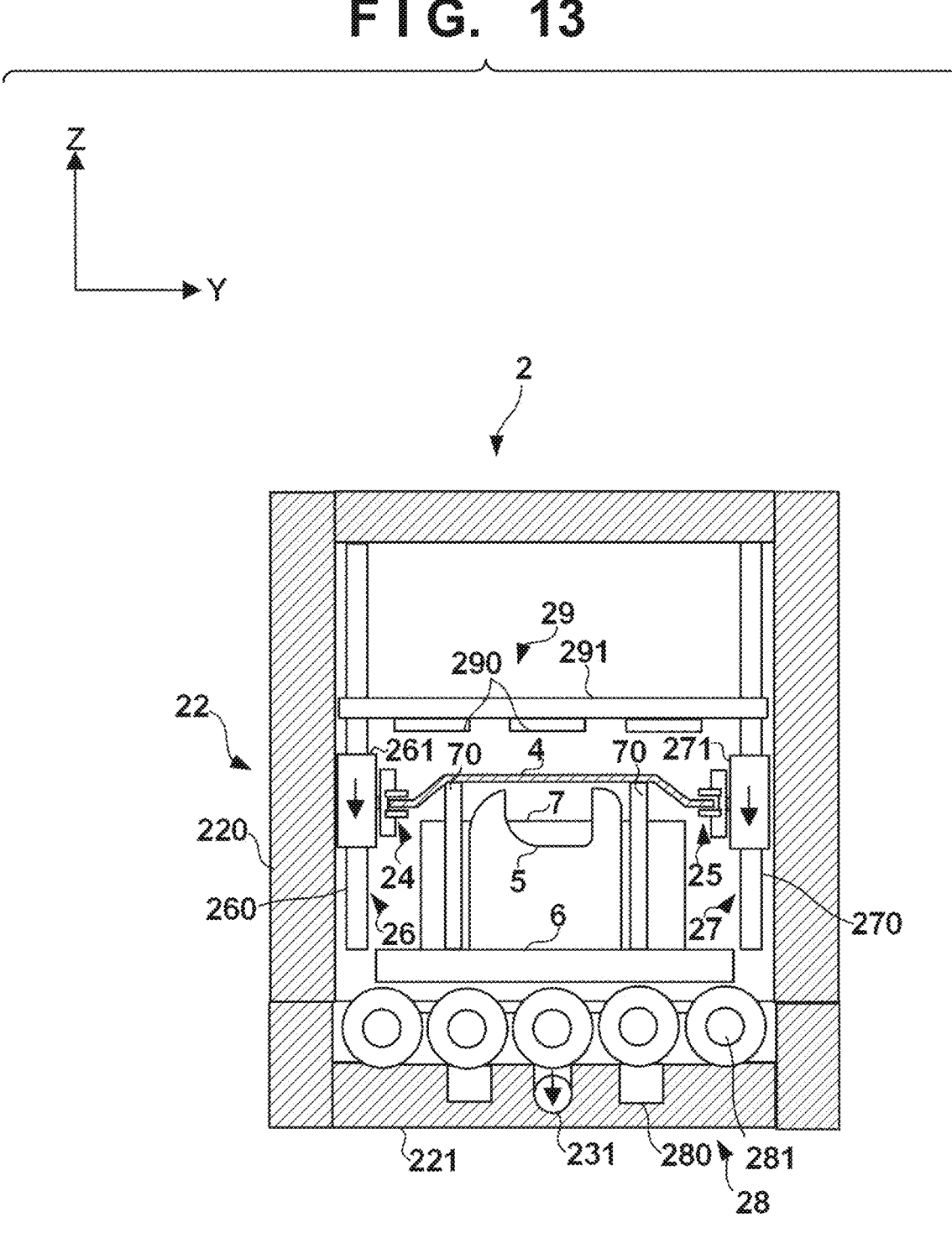
FIG. 13 is an explanatory diagram of an operation of the coating apparatus.

Next, FIGS. 12 and 13 will be referred to. FIG. 12 shows a state in which the plurality of first gripping units 24 and the plurality of second gripping units 25 are lowered. FIG. 13 shows the inside of the chamber 22 in the X direction of FIG. 12. As shown in FIGS. 12 and 13, the plurality of first elevating units 26 lower the plurality of first gripping units 24. The plurality of second elevating units 27 lower the plurality of second gripping units 25. As shown in FIG. 13, due to the plurality of first gripping units 24 and the plurality of second gripping units 25 being lowered, the film 4 and protrusions 70 provided on the jig 7 on which the work to be coated 5 is placed come into in contact with each other. The protrusions 70 are portions formed so as to protrude along the conveying direction of the film 4, and are provided on both sides of the work to be coated 5. The heights of the protrusions 70 are higher than the work to be coated 5 placed on the jig. When the film 4 and the protrusions 70 come into contact with each other, the region surrounded by the film 4, the protrusions 70, the jig 7, and the work to be coated 5 is divided from the region outside of that region. That is, the region surrounded by the film 4 and the jig 7 on which the work to be coated 5 is placed is a sealed space.

The air pressure adjustment unit 23 shown in FIG. 1 increases the pressure inside of the chamber 22. The space sealed by the film 4 and the jig 7 shown in FIG. 13 remains in a reduced pressure state. Therefore, a pressure difference occurs between the space sealed by the film 4 and the jig 7 and the outer space outside of the sealed space. This difference causes the film 4 to coat the work to be coated 5.

Figure 15:
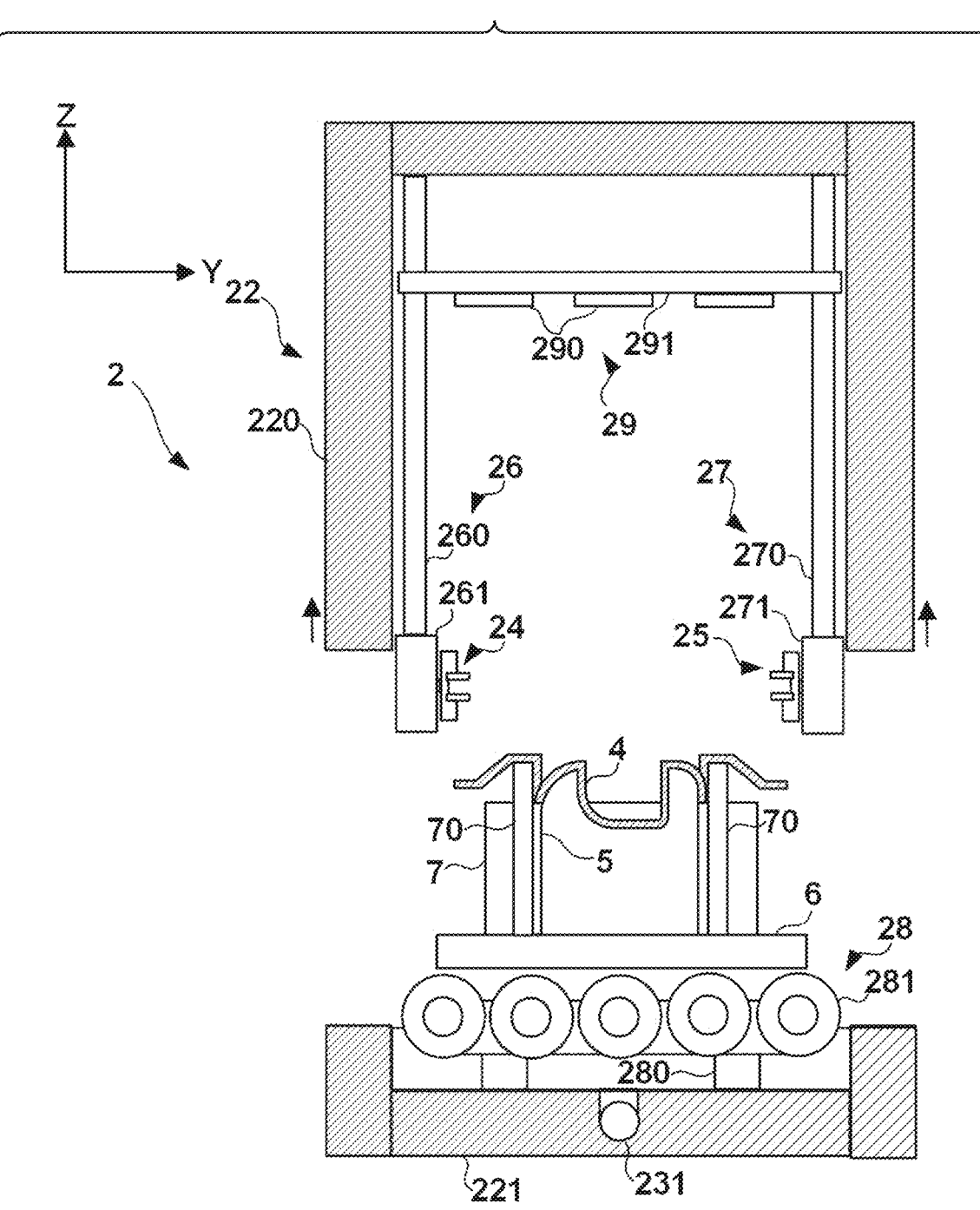
FIG. 15 is an explanatory diagram of an operation of the coating apparatus.

Next, FIGS. 14 and 15 will be referred to. FIGS. 14 and 15 show a state in which the work to be coated 5 is coated with the film 4. FIG. 15 shows the inside of the chamber 22 in the X direction of FIG. 14. After the substrate 5 is coated with the film 4 in FIGS. 12 and 13, the upper chamber 220 is raised. When the upper chamber 220 is raised, the leading end gripping portion 210 releases the film 4. After the upper chamber 220 is raised, the work to be coated 5 that has been coated with the film 4 is carried out of the chamber 22. With the above steps, the operations from the carrying-in of the film 4 and the work to be coated 5 to coating and carry-out are completed.

Second Embodiment

In the first embodiment, a configuration was described in which each of the gripping units 24 and 25 of the plurality of first gripping units 24 and the plurality of second gripping units 25 is a pair of plate-shaped elastic members that sandwich the film 4, but there is no limitation to this. FIGS. 16A to 16D show examples of other configurations of each of the gripping units 24 and 25. FIG. 16A shows a schematic diagram of each of the gripping units 24 and 25 in the X direction. FIGS. 16B to 16D are schematic diagrams in the Y direction of FIG. 16A.

As shown in FIGS. 16A to 16D, gripping portions 240' of each of gripping units 24' and 25' may also be a pair of rotating members that sandwich the film 4. The pair of rotating members are members that rotate about an axis in the Y direction. By gripping the film with the pair of rotating members, the film 4 can be prevented from being torn when the plurality of first gripping units 24 and the plurality of second gripping units 25 are raised and lowered, or when the film 4 is conveyed.

Also, the pair of rotating members in this embodiment may be supported by support members 241' including actuators, as shown in FIG. 16A. This makes it possible to control the gripping state of the pair of rotating members as shown in FIG. 16B, the release state of the pair of rotating members as shown in FIG. 16C, the rotation of the pair of rotating members about the Y direction as shown in FIG. 16D, and the like.

OTHER EMBODIMENTS

In the first embodiment, an example was described in which the pressure inside of the chamber 22 is reduced and then increased by the air pressure adjustment unit 23 to coat the work to be coated 5 with the film 4. The method for coating the work to be coated 5 with the film 4 is not limited to this. For example, the work to be coated 5 may also be coated with the film 4 without being heated. Alternatively, the pressure in the lower chamber 221 may be reduced via the film 4 while the upper chamber 220 is maintained at atmospheric pressure, and the work to be coated 5 may be coated with the film 4 due to the pressure difference between the lower chamber 221 and the upper chamber 220. Also, the work to be coated 5 may be coated with the film 4 without reducing the pressure inside the chamber 220. For example, the work to be coated 5 may also be coated with the film 4 by pressurizing the film 4 with compressed air or the like from the side of the film 4 opposite to the side of the work to be coated 5. Alternatively, the film 4 may be pressed against the work to be coated 5 using a mold or the like to coat the work to be coated 5.

While an embodiment has been described, the invention is not limited to the foregoing embodiments, and various variations/changes are possible within the spirit of the invention.

What is claimed is:

1. A coating apparatus comprising:

a plurality of first gripping units configured to grip a first side of a film conveyed above a work to be coated, the plurality of first gripping units being aligned along the first side;

a plurality of second gripping units configured to grip a second side of the film opposing the first side, the plurality of second gripping units being aligned along the second side;

an elevating unit configured to raise and lower the plurality of first gripping units and the plurality of second gripping units along a shape of the work to be coated; and a plurality of heating units configured to heat the film conveyed above the work to be coated;

wherein the plurality of first gripping units and the plurality of second gripping units are aligned at positions opposing each other, and each of the plurality of heating units is arranged corresponding to a set of a first gripping unit of the plurality of first gripping units and a second gripping unit of the plurality of second gripping units arranged at positions opposing each other.

2. The coating apparatus according to claim 1, wherein the elevating unit includes:

a plurality of first elevating units configured to separately raise and lower the plurality of first gripping units; and a plurality of second elevating units configured to separately raise and lower the plurality of second gripping units.

3. The coating apparatus according to claim 2, wherein the plurality of first elevating units and the plurality of second elevating units each raise and lower a set of the first gripping unit and the second gripping unit arranged at positions opposing each other to the same height, among the plurality of first gripping units and the plurality of second gripping units aligned at positions opposing each other.

4. The coating apparatus according to claim 3, wherein each of the plurality of heating units is capable of being raised and lowered.

5. The coating apparatus according to claim 4, wherein each of the heating units is raised and lowered in synchronization with the corresponding set of the first gripping unit and the second gripping unit.

6. The coating apparatus according to claim 5, wherein the plurality of first elevating units include:

a plurality of first support members that individually support the plurality of first gripping units; and a plurality of first moving mechanisms that are aligned along the first side and are configured to separately move the plurality of first support members in an up-down direction, and wherein the plurality of second elevating units include:

a plurality of second support members that separately support the plurality of second gripping units; and a plurality of second moving mechanisms that are aligned along the second side and are configured to separately move the plurality of second support members in an up-down direction.

7. The coating apparatus according to claim 6, wherein the plurality of first moving mechanisms and the plurality of second moving mechanisms are aligned opposing each other, and wherein each of the heating units is supported between a first support member of the plurality of first support members and a second support member of the plurality of second support members, the first support member and the second support member supporting a set corresponding to a first moving mechanism of the plurality of first moving mechanisms and a second moving mechanism of the plurality of second moving mechanisms, the first moving mechanism and the second moving mechanism being arranged at positions opposing each other.

8. The coating apparatus according to claim 1, wherein each of the plurality of first gripping units and each of the plurality of second gripping units includes:

a gripping portion configured to grip the film conveyed above the work to be coated, and a support portion that rotatably supports the gripping portion.

9. The coating apparatus according to claim 1, wherein each of the plurality of first gripping units and each of the plurality of second gripping units includes a pair of elastic members configured to sandwich the film.

10. The coating apparatus according to claim 1, wherein each of the plurality of first gripping units and each of the plurality of second gripping units includes a pair of rotation members configured to sandwich the film.

11. A coating apparatus comprising:

a chamber in which a work to be coated is placed;

a conveying unit configured to convey a film above the work to be coated;

a plurality of first gripping units configured to grip a first side of the film conveyed above a work to be coated, the plurality of first gripping units being aligned along the first side;

a plurality of second gripping units configured to grip a second side of the film opposing the first side, the plurality of second gripping units being aligned along the second side;

an elevating unit configured to raise and lower the plurality of first gripping units and the plurality of second gripping units along a shape of the work to be coated; and an air pressure adjustment unit configured to adjust air pressure in the chamber.

12. The coating apparatus according to claim 11, wherein each gripping unit of the plurality of first gripping units and the plurality of second gripping units is capable of being switched to a gripping state of gripping the film, and a release state of not gripping but releasing the film.

13. The coating apparatus according to claim 11, wherein the elevating unit raises and lowers each of the gripping units when each of the gripping units is in the release state.

14. The coating apparatus according to claim 12, wherein the conveying unit conveys the film while the plurality of first gripping units and the plurality of second gripping units are in the release state.

15. The coating apparatus according to claim 14, wherein the conveying unit includes:

a third gripping unit configured to grip a leading end in a conveying direction of the film; and a third moving mechanism configured to move the third gripping unit horizontally, and the film to be conveyed by the conveying unit is conveyed so as to pass through a path on which the first side of the film is grippable by the plurality of first gripping units, and pass through a path on which the second side of the film is grippable by the plurality of second gripping units.

16. The coating apparatus according to claim 11, wherein the chamber forms a sealed space surrounded by the film and a jig on which the work to be coated is placed, and an outer space outside of the sealed space; and the air pressure adjustment unit adjusts the air pressure in the sealed space and the outer space.

17. The coating apparatus according to claim 11, further comprising:

a work elevation unit configured to raise and lower the work to be coated in the chamber.

* * * * *